United States Patent
Bal et al.

(10) Patent No.: US 12,093,193 B2
(45) Date of Patent: Sep. 17, 2024

(54) HIGH THROUGHPUT DIGITAL FILTER ARCHITECTURE FOR PROCESSING UNARY CODED DATA

(71) Applicant: STMicroelectronics International N.V., Geneva (CH)

(72) Inventors: Ankur Bal, Greater Noida (IN); Rupesh Singh, Ghaziabad (IN)

(73) Assignee: STMicroelectronics International N.V., Geneva (CH)

( * ) Notice: Subject to any disclaimer, the term of this patent is extended or adjusted under 35 U.S.C. 154(b) by 844 days.

(21) Appl. No.: 17/067,967

(22) Filed: Oct. 12, 2020

(65) Prior Publication Data
US 2021/0133124 A1    May 6, 2021

Related U.S. Application Data

(60) Provisional application No. 62/931,461, filed on Nov. 6, 2019.

(51) Int. Cl.
*G06F 13/16*     (2006.01)
*G06F 7/487*     (2006.01)
(Continued)

(52) U.S. Cl.
CPC ........ *G06F 13/1668* (2013.01); *G06F 7/4876* (2013.01); *G06F 9/3001* (2013.01); *G06F 9/30021* (2013.01); *G06F 17/16* (2013.01)

(58) Field of Classification Search
CPC . H04L 27/362; G06F 13/1668; G06F 9/3001; G06F 9/30021; G06F 7/4876; G06F 17/16; H03M 1/0626; H03M 1/0612
See application file for complete search history.

(56) References Cited

U.S. PATENT DOCUMENTS 5,867,479 A    2/1999    Butash
6,134,569 A    10/2000    Kot
(Continued)

FOREIGN PATENT DOCUMENTS

CN    1525642 A    9/2004
CN    1874330 A    12/2006
(Continued)

OTHER PUBLICATIONS

Sinha, et al. "FIR Filter Compensator for CIC Filter Suitable for SDR," 2016 World Conference on Futuristic Trends in Research and Innovation for Social Welfare (WCFTR'16), 7 pages.
(Continued)

*Primary Examiner* — Ernest Unelus
(74) *Attorney, Agent, or Firm* — Crowe & Dunlevy LLC

(57) ABSTRACT

Individual bits of a K bit unary data word, wherein K is greater than one, are applied to K polyphase finite impulse response filter circuits. Each polyphase finite impulse response filter circuit receives a different bit and operates with a single bit precision to generate from each received bit a filtered output data word. A gain adjustment is applied by a gain stage circuit to each filtered output data word to generate a corresponding gain adjusted output data word. The gain adjusted output data words from the gain stage circuits are summed to generate an output data word. The unary data word may be output from a source such as a data encoder or a quantizer.

22 Claims, 3 Drawing Sheets

(51) Int. Cl.
  *G06F 9/30*    (2018.01)
  *G06F 17/16*   (2006.01)

(56) References Cited

U.S. PATENT DOCUMENTS

| | | | |
|---|---|---|---|
| 6,340,940 | B1 | 1/2002 | Melanson |
| 6,418,134 | B1 | 7/2002 | Geddes et al. |
| 6,480,528 | B1 * | 11/2002 | Patel .................. H04L 5/06 |
| | | | 375/345 |
| 6,606,641 | B1 | 8/2003 | Wittig et al. |
| 6,819,708 | B1 | 11/2004 | Lim et al. |
| 9,015,219 | B2 * | 4/2015 | Bal ................ H03H 17/0664 |
| | | | 708/316 |
| 9,391,634 | B1 * | 7/2016 | Rangachari ........... H03M 3/462 |
| 10,050,607 | B2 | 8/2018 | Bhargava et al. |
| 2003/0202612 | A1 | 10/2003 | Halder et al. |
| 2020/0313685 | A1 * | 10/2020 | McGibney .......... H03H 7/0161 |

FOREIGN PATENT DOCUMENTS

| | | |
|---|---|---|
| CN | 103051890 A | 4/2013 |
| CN | 105991137 A | 10/2016 |
| CN | 106899302 A | 6/2017 |
| JP | 20017736 A | 1/2001 |
| KR | 19990047327 A | 7/1999 |

OTHER PUBLICATIONS

First Office Action and Search Report for counterpart CN Appl. No. 202011220302.1, report dated Nov. 30, 2023, 17 pgs.

Second Office Action and Search Report for counterpart CN Appl. No. 202011220302.1, report dated Apr. 29, 2024, 17 pgs.

* cited by examiner

HIGH THROUGHPUT DIGITAL FILTER ARCHITECTURE FOR PROCESSING UNARY CODED DATA

CROSS REFERENCE TO RELATED APPLICATION

This application claims priority from U.S. Provisional Application for Patent No. 62/931,461 filed Nov. 6, 2019, the disclosure of which is incorporated by reference.

TECHNICAL FIELD

The present invention generally relates to a digital filter and, in particular, to a digital filter configured for high throughput processing of unary coded data.

BACKGROUND

It is common for a system to generate unary coded data. As known in the art, unary coding (also referred to as the unary numeral system or thermometer coding), is an entropy encoding scheme that represents a natural number of value J as a K-bit data word formed by J ones and K-J zeros. Thus, as examples, for J=1 and K=8, the unary encoding of J would be <1,0,0,0,0,0,0,0>; and for J=5 and K=8, the unary encoding of J would be <1,1,1,1,1,0,0,0>.

There is a need in the art to filter unary coded data produced by the system.

SUMMARY

In an embodiment, a circuit comprises: an input configured to receive a K bit unary data word, wherein K is greater than one; K polyphase finite impulse response filter circuits, each polyphase finite impulse response filter circuit configured to receive a different bit of the K bit unary data word and generate therefrom a filtered output data word, each polyphase finite impulse response filter circuit having a single bit precision; K gain stage circuits, each gain stage circuit configured to apply a gain adjustment to the filtered output data word from a corresponding polyphase finite impulse response filter circuit to generate a gain adjusted output data word; and a summation circuit configured to sum the gain adjusted output data words from the K gain stage circuits to generate an output data word.

In an embodiment, a method comprises: receiving a K bit unary data word, wherein K is greater than one; for each bit of the K bit unary data word, performing a polyphase finite impulse response filtering to generate from each bit a filtered output data word, wherein performing polyphase finite impulse response filtering comprises performing the filtering with a single bit precision; applying a gain adjustment to each filtered output data word from a corresponding polyphase finite impulse response filtering to generate a gain adjusted output data word; and summing the gain adjusted output data words to generate an output data word.

BRIEF DESCRIPTION OF THE DRAWINGS

For a better understanding of the embodiments, reference will now be made by way of example only to the accompanying figures in which.

DETAILED DESCRIPTION

Figure 1:
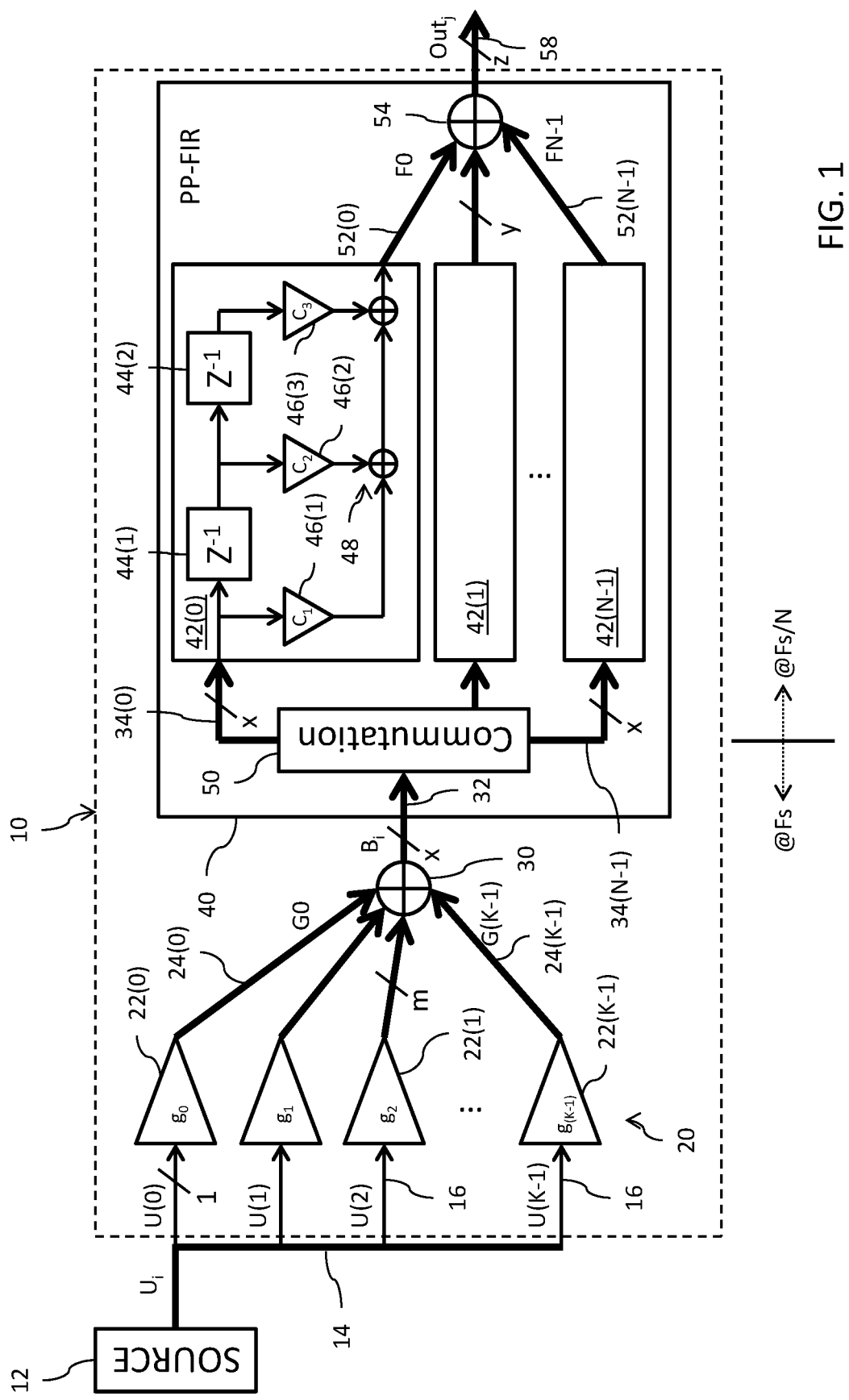
FIG. 1 is a block diagram of a filter circuit for filtering unary coded data.

Reference is now made to FIG. 1 which shows a block diagram of a filter circuit 10 for filtering unary coded data. A source 12, such as a data encoder or quantizer (for example, as used in a Delta-Sigma analog-to-digital converter, see FIG. 4), generates a stream of unary coded data words $U_i$ at a rate Fs, where i represents the index for words in the stream. Each unary coded data word $U_i$ has K bits encoding a natural number of value J, where J may be any integer greater than or equal to 0 and less than or equal to K. The source 12 outputs each unary coded data word $U_i$ in a parallel format over a K bit data bus 14 for input to the filter circuit 10.

The bits U(0)-U(K−1) of the unary coded data word $U_i$ are input to a gain adjustment circuit 20 formed by K gain stages 22. Each gain stage 22 has an input coupled to a bit line 16 of the data bus 14 and is configured to receive a corresponding bit U(bit) of the unary coded data word $U_i$. Thus, the gain stage 22(0) receives bit U(0), the gain stage 22(1) receives bit U(1), ..., and the gain stage 22(K−1) receives bit U(K−1). Each gain stage 22 applies a gain adjustment specified by a gain value g of m bits that is unique to each bit of the unary coded data word $U_i$. For example, the gain stage 22(0) applies a gain adjustment of $g_0$ to bit U(0), the gain stage 22(2) applies a gain adjustment of $g_2$ to bit U(2), ..., and the gain stage 22(K−1) applies a gain adjustment of $g_{(K-1)}$ to bit U(K−1). The gain circuit 20 will generate a plurality (i.e., K) m bit gain adjusted output data words G0 to G(K−1) from the gain stages 22(0) to 22(K−1), respectively, for output on corresponding data buses 24(0) to 24(K−1).

A summation circuit 30 performs a binary addition of the gain adjusted output data words G0 to G(K−1) to generate a binary coded data word $B_i$. Here, the stream of binary coded data words Bi which are output from the circuit 30 are generated at the same rate Fs as the stream of unary coded data words $U_i$, where i represents the index for words in the stream. There are x bits in each binary coded data word $B_i$ which is transmitted over a data bus 32.

In an embodiment, all of the gain values g may be set to unity. In this configuration, the data buses 24(0) to 24(K−1) will be single bit buses (i.e., bit lines where m=1) and the gain adjusted output data words G0 to G(K−1) will each have a single bit of data corresponding (i.e., equal) to the bits U(0)-U(K−1) of the unary coded data word $U_i$.

It will be noted that in the case where all of the gain values g are set to unity, the summation circuit 30 functions as a unary (thermometric) to binary conversion circuit. The value of x will then equal the number of bits needed to binary encode K bits of unary coded data (i.e., $2^x >= K$).

It is more common, however, for the gain values to be non-unity so as to apply a non-integer, fractional correction to the unary coded value of the unary coded data word $U_i$. As an example, each gain stage 22 may apply the m>1 bit gain adjustment, and so the gain adjusted output data words G0 to G(K−1) (corresponding to the bits of the unary coded data word $U_i$) will each be an m bit data word transmitted over the corresponding data buses 24(0) to 24(K−1). The non-unity gain adjustment applied by each gain stage 22 provides a fractional correction used to address a discrepancy between the limitation of the natural number representation of the unary coded data word $U_i$ and the actual non-integer value the coded value represents (for example, a natural number value of 1 in the unary encoding representing an actual non-integer value of 1.05 would use an m bit value for $g_1$ equal to 1.05 (so as to produce the binary coded data word $B_i$ having the value of 1.05) and a natural number value of 2 in the unary coding representing an actual non-integer value of 1.95 would use an m bit value for $g_2$ equal to 0.90 (so as to produce the binary coded data word $B_i$ having the value of 1.05+0.90=1.95)).

The filter circuit 10 further includes a polyphase finite impulse response (PP-FIR) filter 40 that receives the stream of binary coded data words $B_i$ output from the circuit 30. The polyphase finite impulse response filter 40 operates at a rate of Fs/N, where N is the number of partial filter computation (for example, multiply and accumulate—MAC) circuits 42 within the polyphase finite impulse response filter 40. More generally, N is equal to the number of the individual phases of the polyphase finite impulse response filter implementation. The N partial polyphase filter computation circuits 42(0) to 42(N−1) respectively receive N consecutive samples the stream of binary coded data words $B_i$ supplied by a commutation circuit 50 coupled to the output of summation circuit 30. The commutation circuit 50 would, for example, latch and provide the ith sample of binary coded data word $B_i$ to partial polyphase filter computation circuit 42(0) as x bits on data bus 34(0), latch and provide the (i+1)th sample of binary coded data word $B_i$ to partial polyphase filter computation circuit 42(1) as x bits on the corresponding data bus, . . . , and latch and provide the (i+N−1)th sample of binary coded data word $B_i$ to partial polyphase filter computation circuit 42(N−1) as x bits on data bus 34(N−1). From this, the polyphase finite impulse response filter 40 generates one sample of a filtered output data word $Out_j$ at the rate of Fs/N, where j represents the index for words in the stream.

Each partial polyphase filter computation circuit 42 outputs a partial filter data word F having y bits, where y is typically greater than x, on a corresponding data bus 52(0) to 52(N−1). A summation circuit 54 performs a binary addition of the partial filter data words F0 to FN−1 to generate the filtered output data word $Out_j$. Again, the stream of filtered output data words $Out_j$ from the circuit 54 is generated at the same rate Fs/N as the rate of operation for the polyphase finite impulse response filter 40. There are z bits in each filtered output data word $Out_j$, where z is typically greater than y, and the filtered output data word $Out_j$ is output on a data bus 58.

Each partial polyphase filter computation circuit 42 may be generally represented as a multi-tap filter including delay circuits 44, gain stages 46 and summation circuits 48. In the illustrated example, the partial polyphase filter computation circuit 42 includes three taps per polyphase bank (i.e., per partial polyphase filter computation circuit 42). A first delay circuit 44(1) receives a sample of the stream of binary coded data words Bi from the commutation circuit 50 on data bus 34 and a second delay circuit 44(2) receives a first delay of the received sample of the stream of binary coded data words Bi output from delay circuit 44(1) and outputs a second delay of the received sample. The delay circuits 44 may, for example, be implemented using multi-bit shift registers. A first gain stage 46(1) applies a first gain coefficient $C_1$ to the received sample of the stream of binary coded data words Bi, a second gain stage 46(2) applies a second gain coefficient $C_2$ to the first delay of the received sample of the stream of binary coded data words $B_i$, and a third gain stage 46(3) applies a third gain coefficient $C_3$ to the second delay of the received sample of the stream of binary coded data words $B_i$. The summation circuits 48 sum the gain adjusted data words output from the gain stages 46 to generate the partial filter data word F.

The gain coefficients C used in each partial polyphase filter computation circuit 42 will typically be different from each other, with values being dependent on the specification of the filter and the decimation rate. One skilled in the art knows how to determine and set the gain coefficients C for use in each partial polyphase filter computation circuit 42.

It will be noted that the schematic of the partial polyphase filter computation circuit 42 shown in FIG. 1 is an example only. Any suitable configuration as known in the art may be used for the partial polyphase filter computation circuits 42.

The data buses used within circuit 10 may be serial or parallel in configuration. In a preferred embodiment, the buses are implemented in parallel form.

There are drawbacks with respect to the FIG. 1 implementation. The summation circuit 30 is operating at the rate Fs. While this may not be a concern when the gain values g for the gain stage 22 are set to unity, it does present a concern when non-unity gain values are used. The number of bits x can be quite large and the rate Fs can be quite high, for example requiring the mathematical operations to be performed at Gigahertz speed. Furthermore, the number of bits x has a direct impact of the precision required for the polyphase finite impulse response filter 40, and it can be challenging to perform the mathematical operations required by the partial polyphase filter computation circuits 42 at the Fs/N rate with an x-bit precision. It will also be noted that the x bit precision in the polyphase finite impulse response filter 40 requires the use of x bit delay circuits 44 in each partial polyphase filter computation circuit 42. Multiplication of large numbers of bits must be performed in order to apply the gain coefficients C to x bit data words at the Fs/N rate. This requires a not insignificant amount of circuit area and power consumption.

Figure 2:
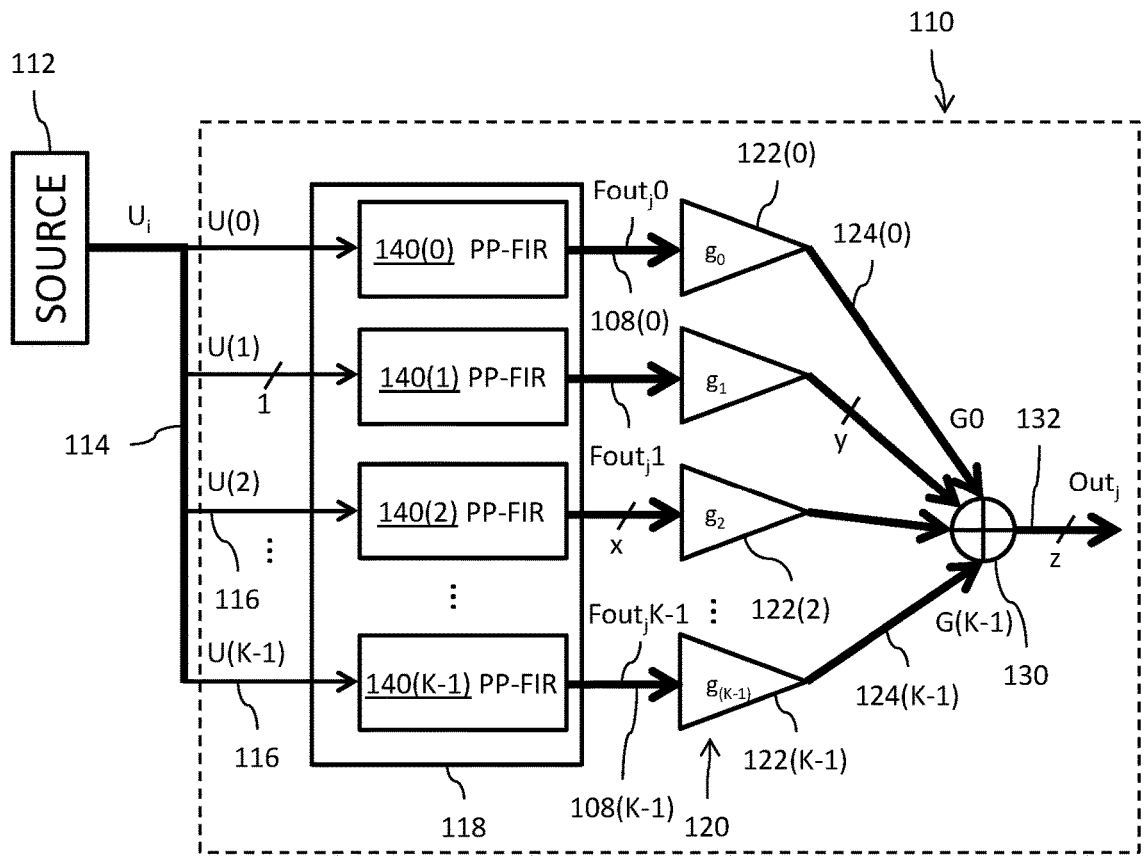
FIG. 2 is a block diagram of a filter circuit for filtering unary coded data.

Reference is now made to FIG. 2 which shows a block diagram of a filter circuit 110 for filtering unary coded data. A source 112, such as a data encoder or quantizer (for example, as used in a Delta-Sigma analog-to-digital converter, see FIG. 4), generates a stream of unary coded data words $U_i$ at a rate Fs, where i represents the index for words in the stream. Each unary coded data word $U_i$ has K bits encoding a natural number of value J, where J may be any integer greater than or equal to 0 and less than or equal to K. The source 112 outputs each unary coded data word $U_i$ in a parallel format over a K bit data bus 114 for input to the filter circuit 110.

The bits U(0)-U(K−1) of the unary coded data word $U_i$ are input to a filter bank circuit 118 comprised of K polyphase finite impulse response (PP-FIR) filter circuits 140(0) to 140(K−1). Each polyphase finite impulse response filter circuit 140 has an input coupled to a bit line 116 of the data bus 114 and is configured to receive a corresponding bit U(bit) of the unary coded data word $U_i$. Thus, the polyphase finite impulse response filter circuit 140(0) receives bit U(0), the polyphase finite impulse response filter circuit 140(1) receives bit U(1), . . . , and the polyphase finite impulse response filter circuit 140(K−1) receives bit U(K−1). This process of data assignment in this fashion to multiple filter banks is commonly referred to in the art as commutation. Each polyphase finite impulse response filter circuit 140 operates at a rate of Fs/N, where N is the number of partial polyphase filter computation circuits within each polyphase finite impulse response filter 140, to generate a filtered output data word Fout$_j$ at the rate Fs/N, where j is the index for the generated stream. Each filtered output data word Fout$_j$ is an x bit word, where x is greater than one, that is output on a corresponding data bus 108(0) to 108(K−1).

The filtered output data words Fout$_j$0 to Fout$_j$K−1 are input to a gain adjustment circuit 120 formed by K gain stages 122. Each gain stage 122 has an input coupled to data bus 108 and is configured to receive a corresponding filtered output data word Fout$_j$. Thus, the gain stage 122(0) receives filtered output data word Fout0, the gain stage 122(1) receives filtered output data word Fout1, . . . , and the gain stage 122(K−1) receives filtered output data word Fout$_j$K−1. Each gain stage 122 applies a gain adjustment specified by a gain value g of m bits that is unique to each bit of the unary coded data word U$_i$. For example, the gain stage 122(0) applies a gain adjustment of g$_0$ to filtered output data word Fout$_j$0 (from bit U(0)), the gain stage 122(2) applies a gain adjustment of g$_2$ to filtered output data word Fout$_j$2 (from bit U(2)), . . . , and the gain stage 122(K−1) applies a gain adjustment of g$_{(K-1)}$ to filtered output data word Fout$_j$K−1 (from bit U(K−1)). The gain circuit 120 will generate gain adjusted output data words G0 to G(K−1) from the gain stages 122(0) to 122(K−1), respectively, as y bit data for output on corresponding y data buses 124(0) to 124(K−1).

A summation circuit 130 performs a binary addition of the gain adjusted output data words G0 to G(K−1) to generate an output data word Out$_j$. Here, the stream of output data words Out$_j$ from the circuit 130 is generated at the same rate Fs/N as the rate of operation for the polyphase finite impulse response filters 140, where j represents the index for words in the stream. There are z bits in each output data word Out$_j$, where z is typically greater than y, which is transmitted over a data bus 132.

In an embodiment, all of the gain values g may be set to unity. In this configuration, x=y and the gain adjusted output data words G0 to G(K−1) will each match the corresponding filtered output data words Fout$_j$0 to Fout$_j$K−1.

It is more common, however, for gain values to be non-unity so as to apply a fractional correction to the filtered output data words Fout$_j$ corresponding to the unary coded data words U$_i$. As an example, each gain stage 122 may apply the m>1 bit gain adjustment, and so the gain adjusted output data words G0 to G(K−1) will each be a y bit data word, wherein y is typically greater than x. The non-unity gain adjustment applied by each gain stage 122 provides a fractional correction used to address a discrepancy between the limitation of the natural number representation of the unary coded data word U$_i$ and the actual non-integer value the coded value represents (see, discussion above).

Figure 3:
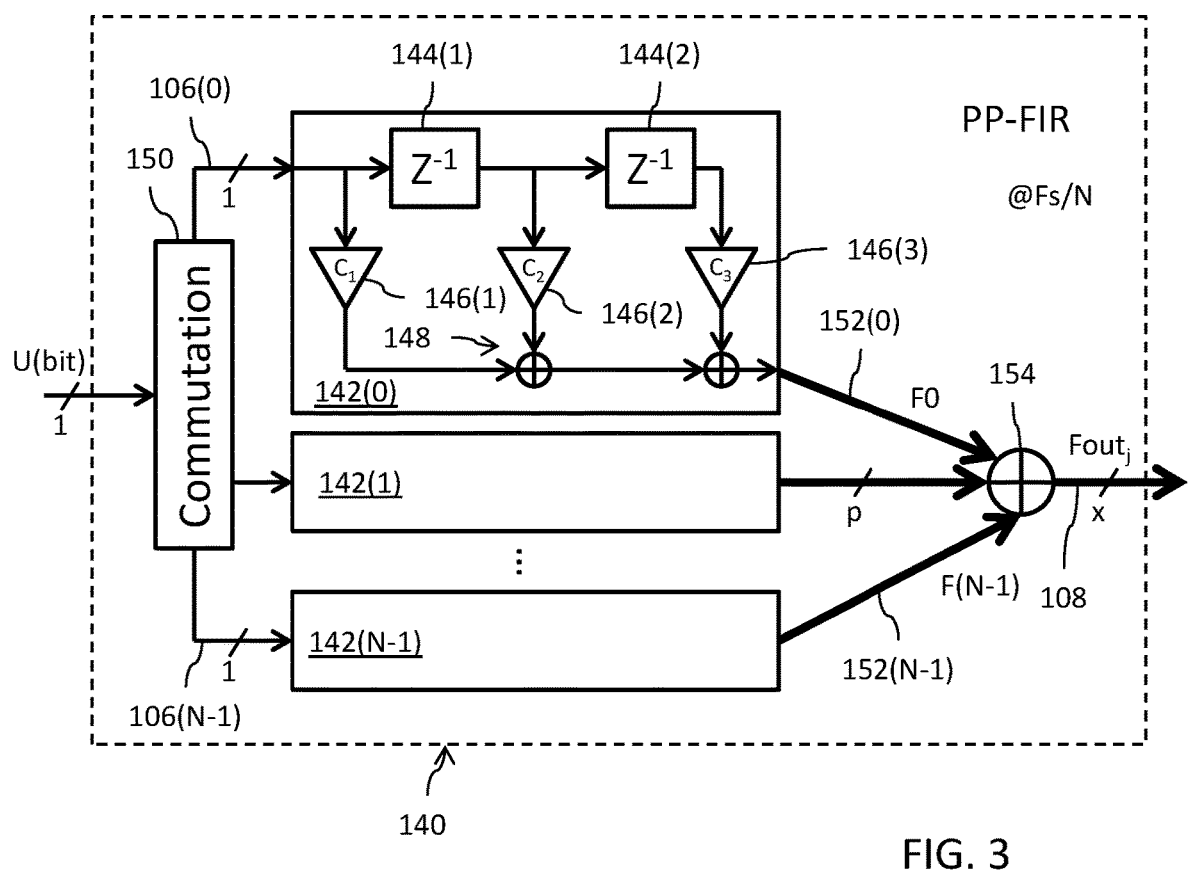
FIG. 3 is a block diagram of a polyphase finite impulse response filter used within the circuit of FIG. 2.

Reference is now made to FIG. 3 which shows a block diagram of the polyphase finite impulse response filter 140 used within the circuit of FIG. 2. The filter 140 receives a single bit U(bit) of the K bit unary coded data word U$_i$ from bit line 116. The single bit is received in a stream at the rate Fs. The polyphase finite impulse response filter 140 operates at a rate of Fs/N, where N is the number of partial filter computation (for example, multiply and accumulate—MAC) circuits 142 within the polyphase finite impulse response filter 140. More generally, N is equal to the number of the individual phases of the polyphase finite impulse response filter implementation. The N partial polyphase filter computation circuits 142(0) to 142(N−1) respectively receive N consecutive samples of the bit U(bit) from the stream of binary coded data words B$_i$ supplied by a commutation circuit 150 coupled to receive the single bit U(bit) from the source 112. The commutation circuit 150 would, for example, latch and provide the ith sample of the bit U(bit) to partial polyphase filter computation circuit 142(0) on the one bit data bus 106(0), latch and provide the (i+1)th sample of the bit U(bit) to partial polyphase filter computation circuit 142(1) on the one bit data bus, . . . , and latch and provide the (i+N−1)th sample of the bit U(bit) to partial polyphase filter computation circuit 142(N−1) on the one bit data bus 106(N−1). From this, the polyphase finite impulse response filter 140 generates at the rate of Fs/N one sample of a filtered output data word F having p bits, where p is greater than 1, on data bus 152.

A summation circuit 154 performs a binary addition of the partial filter data words F0 to F(N−1) to generate a filtered output data word Fout$_j$. Here, the stream of filtered output data words Fout$_j$ from the circuit 154 is generated at the same rate Fs/N as the rate of operation for the polyphase finite impulse response filter 140, where j represents the index for words in the stream. There are x bits in each filtered output data word Fout$_j$, where x is typically greater than p, output on data bus 108.

Each partial polyphase filter computation circuit 142 may be generally represented as a multi-tap filter including delay circuits 144, gain stages 146 and summation circuits 148. In the illustrated example, the partial polyphase filter computation circuit 142 includes three taps per partial polyphase filter computation circuit 142. A first delay circuit 144(1) receives a single bit U(bit) of the K bit unary coded data word U$_i$ and a second delay circuit 144(2) receives a first delay of the received single bit of the K bit unary coded data word U$_i$ from delay circuit 144(1) and outputs a second delay of the received single bit. The delay circuits 144 may, for example, be implemented using single-bit shift registers or flip-flops. A first gain stage 146(1) applies a first gain coefficient $C_1$ to the received single bit of the K bit unary coded data word U$_i$, a second gain stage 146(2) applies a second gain coefficient $C_2$ to the first delay of the single bit of the K bit unary coded data word U$_i$, and a third gain stage 46(3) applies a third gain coefficient $C_3$ to the second delay of the single bit of the K bit unary coded data word U$_i$. The summation circuits 148 sum the gain adjusted data words output from the gain stages 146 to generate the partial filter data word F.

The gain coefficients C used in each partial polyphase filter computation circuit 142 will typically be different from each other, with values being dependent on the specification of the filter and the decimation rate. One skilled in the art knows how to determine and set the gain coefficients C for use in each partial polyphase filter computation circuit 142.

It will be noted that the schematic of the partial polyphase filter computation circuit 42 shown in FIG. 3 is an example only. Any suitable configuration know in the art may be used for the partial polyphase filter computation circuits 142.

FIG. 3 further shows a truth table for operation of the partial polyphase filter computation circuit 142. Because each partial polyphase filter computation circuit 142 is operating on only a single bit (i.e., single bit precision), the partial filter data word F is the sum of the gain coefficients C selected by the logical value of the single bits of the K bit unary coded data word U$_i$ which are being processed. So, consider that three consecutive samples of the single bit of the K bit unary coded data word U$_i$ have logic values of 0,0,0. The output from the gain stages 146 will by $0*C_1=0$, $0*C_2=0$ and $0*C_3=0$. The summation produced by summation circuits 148 for the partial filter data word F will be a p bit data word with a value of C=0. Conversely, consider that three consecutive samples of the single bit of the K bit unary coded data word U$_i$ have logic values of 0,1,1. The output from the gain stages 146 will by $0*C_1=0$, $1*C_2=C_2$ and $1*C_3=C_3$. The summation produced by summation circuits 148 for the partial filter data word F will be a p bit data word with a value of $C=C_2+C_3$.

The data buses used within circuit 110 may be serial or parallel in configuration. In a preferred embodiment, the buses are implemented in parallel form.

The implementation of the filter 110 of FIGS. 2-3 provides a number of advantages over the filter 10 of FIG. 1. Filtering operations are performed directly on the unary data, which obviates the need for a unary to binary conversion performed at a high (for example, Fs) data rate. Critical computations are reduced to single bit operations which permits a very fast implementation. There is a corresponding reduction in required power (for example, at least 20%). Furthermore, the critical path for processing is independent of the number of unary elements (i.e., bits U(bit)) in the unary coded data word $U_i$. The design of the filter is also scalable (to multi-GHz operation) with immunity to gain of unary to binary conversion and FIR coefficients.

Figure 4:
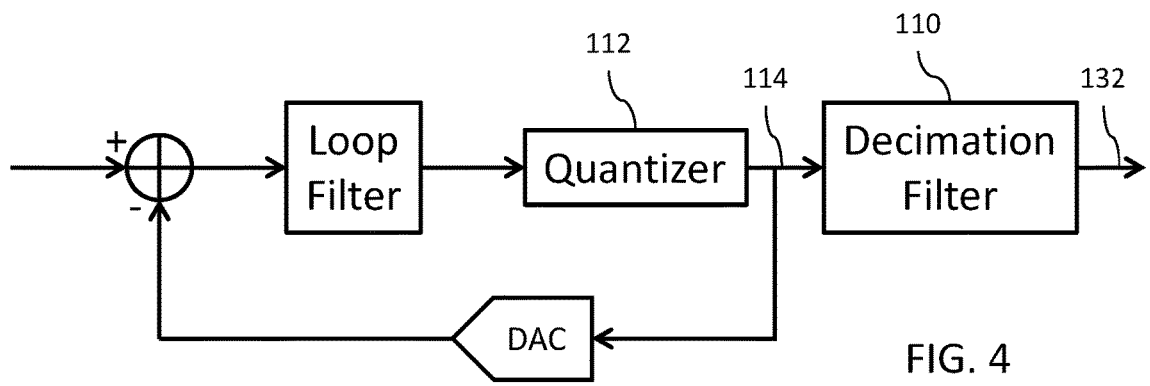
FIG. 4 is a basic block diagram of a Delta-Sigma analog-to-digital converter circuit which utilizes the filter of FIGS. 2-3.

Reference is now made to FIG. 4 which shows a basic block diagram of a Delta-Sigma analog-to-digital converter circuit which utilizes the filter 110. It will be noted that the filter 110 operates to filter and decimate thermometric (unary) coded data words output from a quantizer. The quantizer output is further passed in a feedback loop through a digital-to-analog converter to generate an analog feedback signal which is subtracted by a summation circuit from the analog input signal. The resulting difference signal is filtered in the loop filter circuit (for example, using an integrator) and applied to the input of the quantizer which generates the thermometric (unary) coded data words.

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

What is claimed is:

1. A circuit, comprising:
an input configured to receive a K bit unary coded data word, wherein K is greater than one;
K polyphase finite impulse response filter circuits, each polyphase finite impulse response filter circuit receiving a different single bit of the K bit unary coded data word and generating therefrom a filtered output data word, each polyphase finite impulse response filter circuit having a single bit precision;
K gain stage circuits, each gain stage circuit applying a gain adjustment to the filtered output data word from a corresponding polyphase finite impulse response filter circuit to generate a gain adjusted output data word; and
a summation circuit summing the gain adjusted output data words from the K gain stage circuits to generate each output data word.

2. The circuit of claim 1, wherein the input receives a stream of the K bit unary coded data words at a rate Fs, and each polyphase finite impulse response filter circuit generates a stream of the filtered output data words at a rate Fs/N, wherein N is greater than one.

3. The circuit of claim 2, wherein N is a number of partial polyphase filter computation circuits within each polyphase finite impulse response filter circuit.

4. The circuit of claim 3, wherein each partial polyphase filter computation circuit is a multiply and accumulate circuit (MAC).

5. The circuit of claim 4, wherein each MAC includes a delay circuit, and wherein the delay circuit is a single bit delay element.

6. The circuit of claim 5, wherein the single bit delay element is a flip-flop.

7. The circuit of claim 2, wherein N is a number of phases for an implementation of the polyphase finite impulse response filter circuit.

8. The circuit of claim 1, wherein the gain adjustment for each gain stage circuit provides for a fractional correction of the unary coded data word.

9. The circuit of claim 1, further comprising a source circuit configured to supply the K bit unary coded data word.

10. The circuit of claim 9, wherein the source circuit is a quantizer.

11. The circuit of claim 10, wherein the quantizer is part of a Delta-Sigma analog-to-digital converter.

12. The circuit of claim 9, wherein the source circuit is a data encoder.

13. A method, comprising:
receiving a K bit unary coded data word, wherein K is greater than one;
for each bit of the K bit unary coded data word, performing a polyphase finite impulse response filtering to generate from each bit a filtered output data word, wherein performing polyphase finite impulse response filtering comprises performing the filtering with a single bit precision;
applying a gain adjustment to each filtered output data word from a corresponding polyphase finite impulse response filtering to generate a gain adjusted output data word; and
summing the gain adjusted output data words to generate each output data word.

14. The method of claim 13, wherein receiving comprises receiving a stream of the K bit unary coded data words at a rate Fs, and wherein the polyphase finite impulse response filtering generates a stream of the filtered output data words at a rate Fs/N, wherein N is greater than one.

15. The method of claim 14, wherein N is a number of partial filter computations performed for each polyphase finite impulse response filtering.

16. The method of claim 14, wherein each partial filter computation comprises performing a multiply and accumulate operation.

17. The method of claim 14, wherein N is a number of phases for an implementation of the polyphase finite impulse response filtering.

18. The method of claim 13, wherein applying the gain adjustment comprises implementing a fractional correction of the unary data word.

19. The method of claim 13, further comprising supplying the K bit unary coded data word from source circuit.

20. The method of claim 19, wherein the source circuit is a quantizer.

21. The method of claim 20, wherein the quantizer is part of a Delta-Sigma analog-to-digital converter.

22. The method of claim 19, wherein the source circuit is a data encoder.

* * * * *